(12) United States Patent
Liu et al.

(10) Patent No.: US 11,885,292 B2
(45) Date of Patent: Jan. 30, 2024

(54) TIDAL CURRENT ENERGY GENERATING DEVICE

(71) Applicant: HangZhou JiangHe Hydro-Electrical Science& Technology Co., Ltd., Hangzhou (CN)

(72) Inventors: Changlu Liu, Hangzhou (CN); Xueming Zhang, Hangzhou (CN); Zhengming Zhou, Hangzhou (CN); Liwei Chen, Hangzhou (CN); Wanqiang Zhu, Hangzhou (CN); Jinbo Hu, Hangzhou (CN); Jianmei Chen, Hangzhou (CN); Yinhua Chen, Hangzhou (CN); Yongjun Dong, Hangzhou (CN); Shanguo Peng, Hangzhou (CN); Zhumei Fang, Hangzhou (CN); Panhua Ning, Hangzhou (CN)

(73) Assignee: HangZhou JiangHe Hydro-Electrical Science & Technology Co., Ltd., Hangzhou (CN)

( * ) Notice: Subject to any disclaimer, the term of this patent is extended or adjusted under 35 U.S.C. 154(b) by 290 days.

(21) Appl. No.: 17/534,161

(22) Filed: Nov. 23, 2021

(65) Prior Publication Data

US 2022/0082076 A1    Mar. 17, 2022

(30) Foreign Application Priority Data

Oct. 13, 2021    (CN) .......................... 202111192975.5

(51) Int. Cl.
*F03B 13/26*    (2006.01)

(52) U.S. Cl.
CPC ...... *F03B 13/264* (2013.01); *F05B 2210/404* (2013.01); *F05B 2220/706* (2013.01); *F05B 2240/301* (2013.01)

(58) Field of Classification Search
CPC .. F03B 13/264; F03B 3/145; F05B 2210/404; F05B 2240/301; F05B 2260/70
(Continued)

(56) References Cited

U.S. PATENT DOCUMENTS 4,495,423 A * 1/1985 Rogers .................. F03D 7/0224
                                                          290/55
5,795,132 A * 8/1998 Wheeler ................. B64C 11/34
                                                          416/155

(Continued)

FOREIGN PATENT DOCUMENTS

| CN | 103397980 A | 11/2013 | |
|---|---|---|---|
| CN | 104481790 A | 4/2015 | |
| GB | 2347976 A * | 9/2000 | .............. F03B 17/06 |

*Primary Examiner* — Charles Reid, Jr.

(57) ABSTRACT

A tidal current energy generating device includes a generator, a connecting shaft, an impeller and an adjustment assembly. The impeller includes an impeller hub and an impeller blade arranged thereon. The impeller hub is connected with the connecting shaft, and the generator is connected with the impeller hub. The impeller blade is driven under the action of a tidal current to drive the impeller hub to rotate synchronously around an axis of the connecting shaft, driving the generator to generate electricity. The adjustment assembly is connected with the impeller blade, and can be driven to swing under the action of the tidal current to drive the impeller blade to rotate around the axis of the impeller blade relative to the impeller hub, thereby adjusting the angle of the impeller blade.

9 Claims, 13 Drawing Sheets

(58) Field of Classification Search
USPC .................................................. 290/42, 53
See application file for complete search history.

(56) References Cited

U.S. PATENT DOCUMENTS 8,698,331 B2 * 4/2014 Carter .................... F03B 13/22
290/43
2010/0290908 A1 11/2010 Denniss et al.

* cited by examiner

TIDAL CURRENT ENERGY GENERATING DEVICE

CROSS-REFERENCE TO RELATED APPLICATIONS

This application claims the benefit of priority from Chinese Patent Application No. 202111192975.5, filed on Oct. 13, 2021. The content of the aforementioned application, including any intervening amendments thereto, is incorporated herein by reference in its entirety.

TECHNICAL FIELD

The application relates to utilization of ocean tidal current energy and fluid machinery, and more particularly to a tidal current energy generating device.

BACKGROUND

Tidal energy is a clean, safe and renewable source of energy, and currently, extensive researches have been conducted on the development of a tidal current energy generating device around the world. Considering that the direction of the tidal current direction will change over time, the angle of the impeller on the tidal current energy generating device needs to be adjusted to adapt to the direction of the tidal current, such that the impeller can receive a moderate amount of tidal current energy to drive the generator to generate electricity. In the existing tidal current energy generating devices, the angle of the impeller is adjusted generally by hydraulic or electric drive. Unfortunately, the hydraulic or electric drive device is prone to being influenced by the ocean water and the water pressure, attenuating the reliability of the hydraulic or electric drive in the ocean environment.

SUMMARY

In view of the defects in the prior art, an object of this disclosure is to provide a tidal current energy generating device with desirable reliability in the ocean environment.

Technical solutions of the disclosure are described as follows.

The present disclosure provides a tidal current energy generating device, comprising:
  a generator;
  a connecting shaft;
  an impeller; and
  an adjustment assembly;
  wherein the impeller comprises an impeller blade and an impeller hub; the impeller blade is arranged on the impeller hub; the impeller hub is connected with the connecting shaft, and the generator is connected with the impeller hub; the impeller blade is configured to drive the impeller hub to rotate synchronously around an axis of the connecting shaft under an action of a tidal current, so as to drive the generator to generate electricity; and
  the adjustment assembly is connected with the impeller blade; the adjustment assembly is configured to swing under the action of the tidal current to drive the impeller blade to rotate around an axis of the impeller blade relative to the impeller hub to adjust an angle of the impeller blade, so that an energy received by the impeller blade from the tidal current is adjusted to adjust a rotating speed of the impeller blade around the axis of the connecting shaft, adjusting a power of the generator.

Compared to the prior art, the present disclosure has the following beneficial effects.

Regarding the tidal current energy generating device, the impeller blade is configured to drive the impeller hub to rotate synchronously around the axis of the connecting shaft under the action of the tidal current, thereby driving the generator for electricity generation. In addition, the adjustment assembly can swing under the action of the tidal current to drive the impeller blade to rotate around the axis of the impeller blade relative to the impeller hub to adjust the angle of the impeller blade, so that the energy received by the impeller blade from the tidal current is adjustable, and the torque obtained by the impeller blade is adjustable. As a consequence, the rotating speed of the impeller blade around the axis of the connecting shaft is adjustable, rendering the power of the generator adjustable. In this disclosure, the angle of the impeller can be adjusted through the adjustment assembly under the action of the tidal current without additional hydraulic or electric drive, which not only enhances the adjustment reliability, but also reduces the energy consumption.

Figure 1:
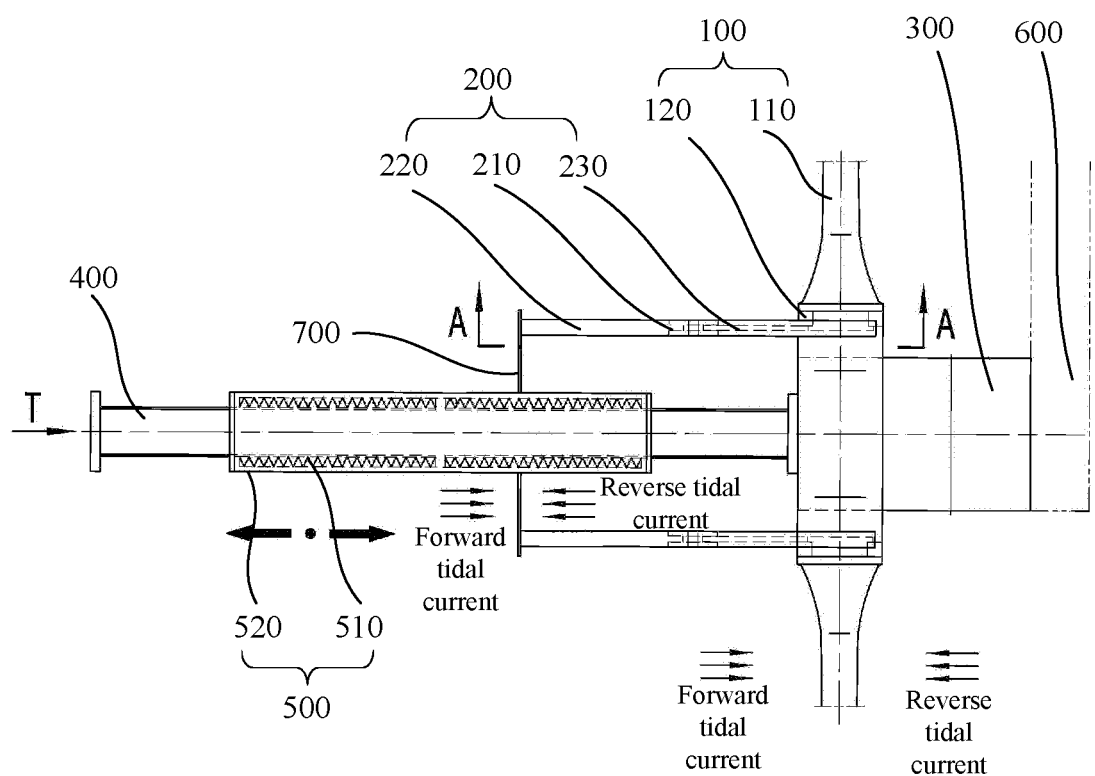
FIG. 1 is a front view of a tidal current energy generating device according to an embodiment of the present disclosure.

In the drawings: 100: impeller; 110: impeller blade; 120: impeller hub; 200: adjustable assembly; 210: adjustment wheel; 220: adjustment plate; 221: concavo-convex portion; 2211: first concavo-convex portion; 22111: first edge; 22112: second edge; 22113: third edge; 22114: fourth edge; 2212: second concavo-convex portion; 22121: fifth edge; 22122: sixth edge; 22123: seventh edge; 22124: eighth edge; 230: adjustment rod; 300: generator; 400: connecting shaft; 500: elastic assembly; 510: elastic component; 520: sleeve; 600: fixing frame; and 700: thrust plate.

DETAILED DESCRIPTION OF EMBODIMENTS

The tidal current energy generating device of this disclosure can adjust the angle of the blade to adapt to the flow direction of the tidal current to bi-directionally capture the tidal current energy during the rise and fall of the tide to drive the generator for electricity generation.

Referring to an embodiment shown in FIG. 1, a tidal current energy generating device includes a generator 300, a connecting shaft 400, an impeller 100, and an adjustment assembly 200. The impeller 100 includes an impeller blade 110 and an impeller hub 120. The impeller blade 110 is arranged on the impeller hub 120. The impeller hub 120 is connected with the connecting shaft 400, and the generator 300 is connected with the impeller hub 120. The impeller blade 110 is configured to drive the impeller hub 120 to rotate synchronously around an axis of the connecting shaft 400 under an action of a tidal current, so as to drive the generator 300 to generate electricity. The adjustment assembly 200 is connected with the impeller blade 110. The adjustment assembly 200 is configured to swing under the action of the tidal current to drive the impeller blade 110 to rotate around an axis of the impeller blade 110 relative to the impeller hub 120 to adjust an angle of the impeller blade 110, such that an energy received by the impeller blade 110 from the tidal current is adjusted to adjust a rotating speed of the impeller blade 110 around the axis of the connecting shaft 400, adjusting a power of the generator 300.

The impeller blade 110 is configured to drive the impeller hub 120 to rotate synchronously around the axis of the connecting shaft 400 under the action of the tidal current, thereby driving the generator 300 for electricity generation. In addition, the adjustment assembly 200 can swing under the action of the tidal current to drive the impeller blade 110 to rotate around the axis of the impeller blade 110 relative to the impeller hub 120 to adjust the angle of the impeller blade 110, so that the energy received by the impeller blade 110 from the tidal current is adjustable, and the torque obtained by the impeller blade 110 is adjustable. As a consequence, the rotating speed of the impeller blade 110 around the axis of the connecting shaft 400 is adjustable, rendering the power of the generator 300 adjustable. In this disclosure, the angle of the impeller 100 can be adjusted through the adjustment assembly 200 under the action of the tidal current without additional hydraulic or electric drive, which not only enhances the adjustment reliability, but also reduces the energy consumption.

In this embodiment, the angle of the impeller blade 110 is adjustable to make the tidal current velocity at two sides of the impeller blade 110 different, thereby the water pressure difference generated at two sides of the impeller blade 110 is adjustable. As a consequence, the rotating speed of the impeller blade 110 and the impeller hub 120 driven by the impeller blade 110 synchronously around the axis of the connecting shaft 400 is adjustable. With the consistent tidal current velocity, the tidal current energy received by the impeller blade 110 from the tidal current is adjustable, that is, the energy harvesting efficiency is adjustable.

Figure 2:
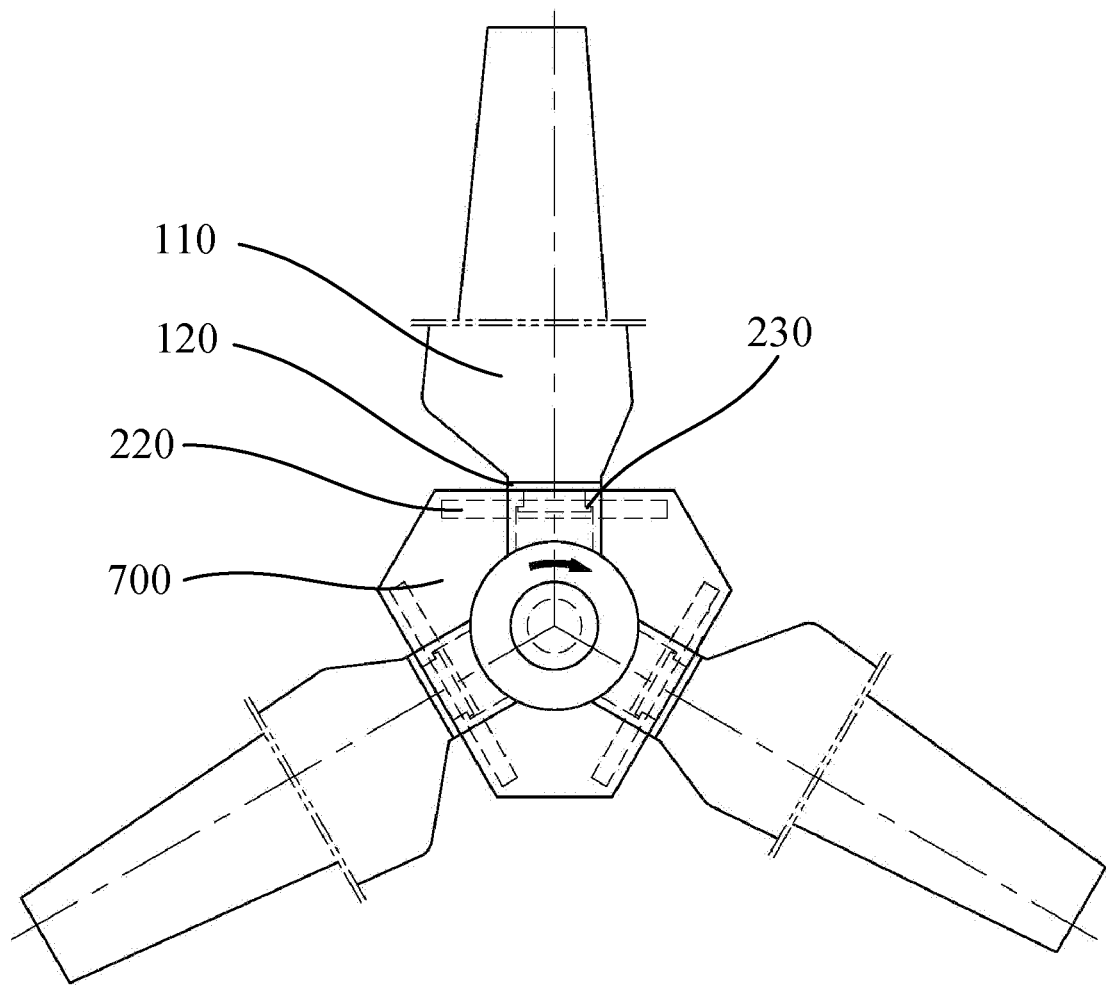
FIG. 2 shows the tidal current energy generating device from direction T of FIG. 1.

Referring to an embodiment shown in FIG. 2, a plurality of the impeller blades 110 are provided, which are arranged spaced apart on the impeller hub 120. In this embodiment, three impeller blades 110 are provided, which are arranged spaced apart on the impeller hub 120.

Referring to an embodiment shown in FIGS. 1-2, a plurality of impeller blades 110 are arranged spaced apart on the outer circumference of the impeller hub 120.

A plurality of adjustment assemblies 200 are provided, and the adjustment assemblies 200 and the impeller blades 110 are in one-to-one correspondence.

Figure 3:
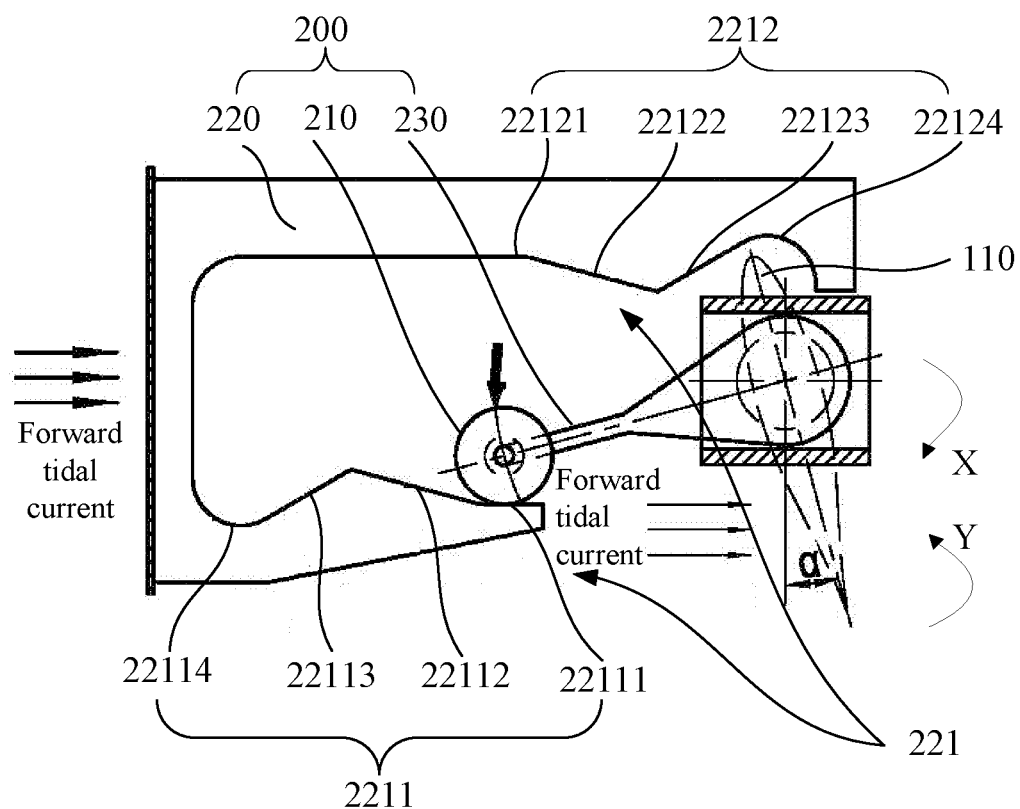
FIGS. 3-10 are sectional views of the tidal current energy generating device along A-A in FIG. 1.
Figure 4:
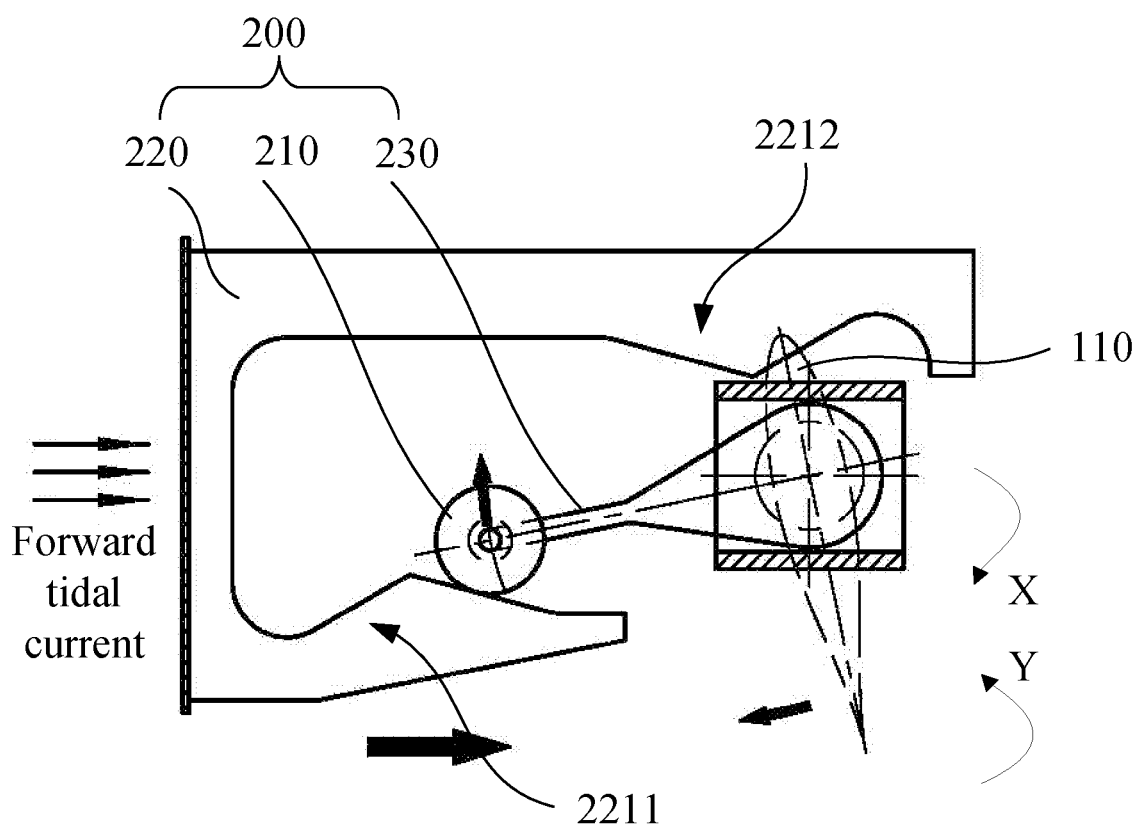
Figure 5:
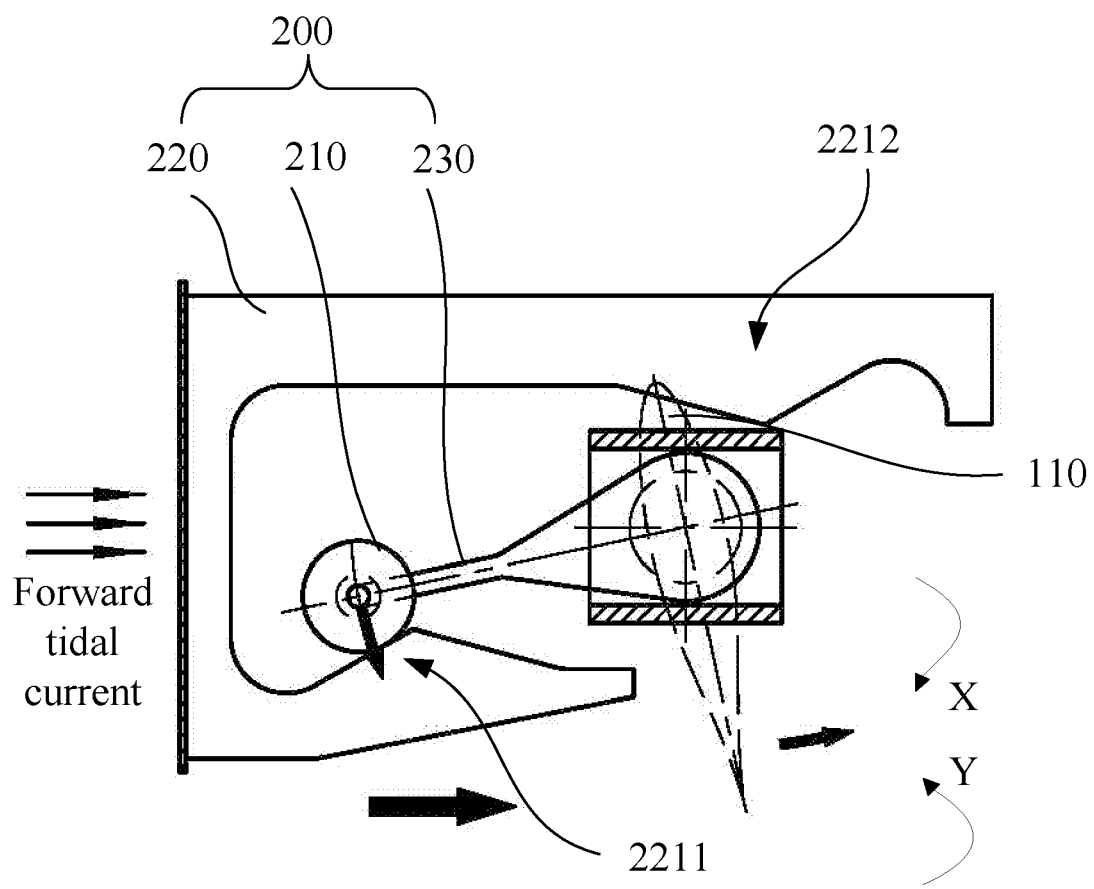
Figure 6:
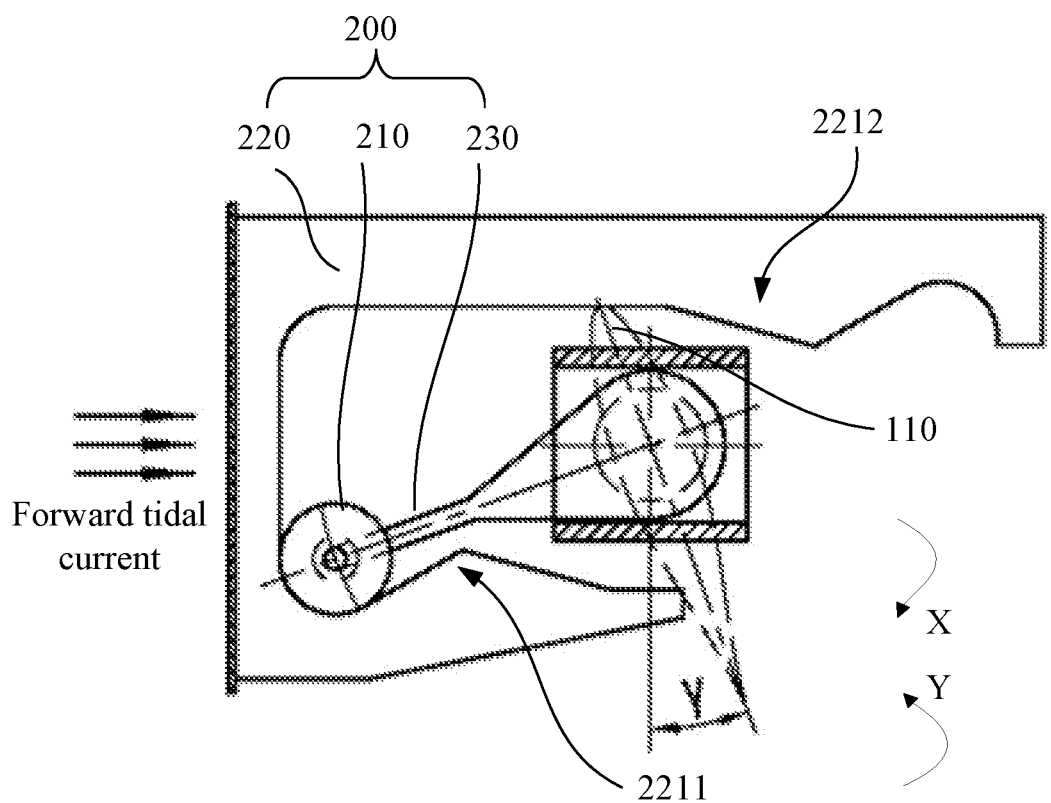

Referring to an embodiment shown in FIGS. 1 and 3, the adjustment assembly 200 includes an adjustment wheel 210 and an adjustment plate 220, and the adjustment plate 220 is provided with a concavo-convex portion 221. The adjustment wheel 210 is configured to abut on the concavo-convex portion 221, and the adjustment wheel 210 is connected with the impeller blade 110. The adjustment plate 220 is configured to move relative to the adjustment wheel 210 along a first direction or a second direction opposite to the first direction under the action of the tidal current, so that a position where the concavo-convex portion 221 is in contact with the adjustment wheel 210 is changed to drive the adjustment wheel 210 to swing to drive the impeller blade 110 to rotate around the axis of the impeller blade 110 relative to the impeller hub 120, so as to adjust the angle of the impeller blade 110. In this embodiment, the first direction is along the direction of the forward tidal current in FIG. 3, and the second direction is along the direction of the reverse tidal current in FIG. 7. The forward tidal current corresponds to the flood tidal current, and the reverse tidal current corresponds to the ebb tidal current.

The impeller blade 110 is configured to rotate around the axis of the impeller blade 110 under the action of the tidal current to drive the adjustment wheel 210 to abut on the concavo-convex portion 221. In this embodiment, the tidal current energy generator device is located in the ocean in use, and the impeller blade 110 is in a direct contact with the tidal current. Therefore, when the tidal current is generated, the impeller blade 110 rotates around the axis of the impeller blade 110 under the action of the tidal current, so that the impeller blade 110 will drive the adjustment wheel 210 connected therewith to be close to and abut on the concavo-convex portion 221.

In this embodiment, with different tidal current velocity, the tidal energy received from the tidal current by the impeller blade 110 is different. When the tidal current velocity is low, the angle of the impeller blade 110 relative to the impeller hub 120 is adjusted by the adjustment assembly 200, so that the impeller blade 110 receives more tidal current energy from the tidal current and the impeller blade 110 obtains a larger torque, which facilitates the starting of the impeller blade 110, that is, it is convenient for the impeller blade 110 to drive the impeller hub 120 to synchronously rotate around the axis of the connecting shaft 400. When the tidal current velocity increases, the angle of the impeller blade 110 relative to the impeller hub 120 is adjusted by the adjustment assembly 200, so that the lift force increases and the resistance force decreases, both of which are generated by the impeller blade 110 under the action of the tidal current, thereby increasing the energy harvesting efficiency of the impeller blade 110. The generator 300 is driven for electricity with higher power. In the disclosure, the lift force is the force that applied to activate the impeller blade 110 to rotate under the tidal current, and the resistance force is the force that applied to resist the rotation of the impeller blade 110 under the tidal current.

When the tidal current velocity is too high, the angle of the impeller blade 110 relative to the impeller hub 120 is adjusted by the adjustment assembly 200 to decrease the lift force and increase the resistance force, both of which are generated by the impeller blade 110 under the action of the tidal current, such that the energy harvesting efficiency of the impeller blade 110 is decreased. The generator 300 is driven to generate electricity with lower power, so as to avoid the damage to the impeller blade 110 or the generator 300 caused by overload.

Referring to an embodiment shown in FIG. 1, the connecting shaft 400 extends along the first direction, and the adjustment plate 220 is sleeved on the connecting shaft 400 and is configured to move along the first direction or the second direction relative to the connecting shaft 400. The connecting shaft 400 guides the movement of the adjustment plate 220 along the first direction or the second direction.

Referring to an embodiment shown in FIG. 3, the concavo-convex portion 221 includes a first concavo-convex portion 2211 and a second concavo-convex portion 2212 opposite to each other. The tidal current is configured to flow along the first direction or the second direction. The adjustment wheel 210 is configured to abut on the first concavo-convex portion 2211. The adjustment plate 220 is configured to be driven under the action of the tidal current flowing along the first direction to move along the first direction relative to the adjustment wheel 210, so that so that a position where the first concavo-convex portion 2211 is in contact with the adjustment wheel 210 is changed to allow the adjustment wheel 210 to swing to drive the impeller blade 110 to rotate around the axis of the impeller blade 110 relative to the impeller hub 120, adjusting the angle of the impeller blade 110. The adjustment wheel 210 is configured to abut on the second concavo-convex portion 2212. The adjustment plate 220 is configured to be driven under the action of the tidal current flowing along the second direction to move along the second direction relative to the adjustment wheel 210, so that a position where the second concavo-convex portion 2212 is in contact with the adjustment wheel 210 is changed to allow the adjustment wheel 210 to swing to drive the impeller blade 110 to rotate around the axis of the impeller blade 110 relative to the impeller hub 120, adjusting the angle of the impeller blade 110.

Figure 7:
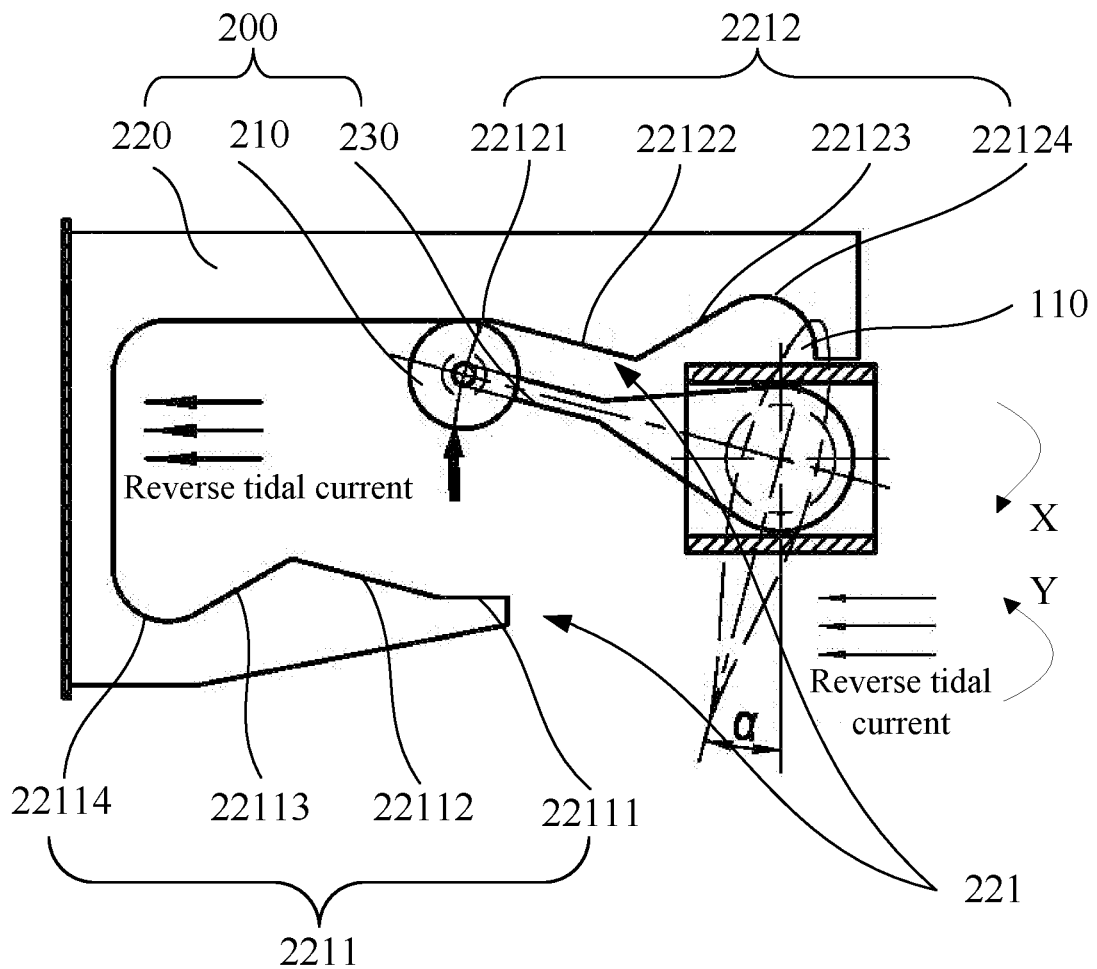
Figure 8:
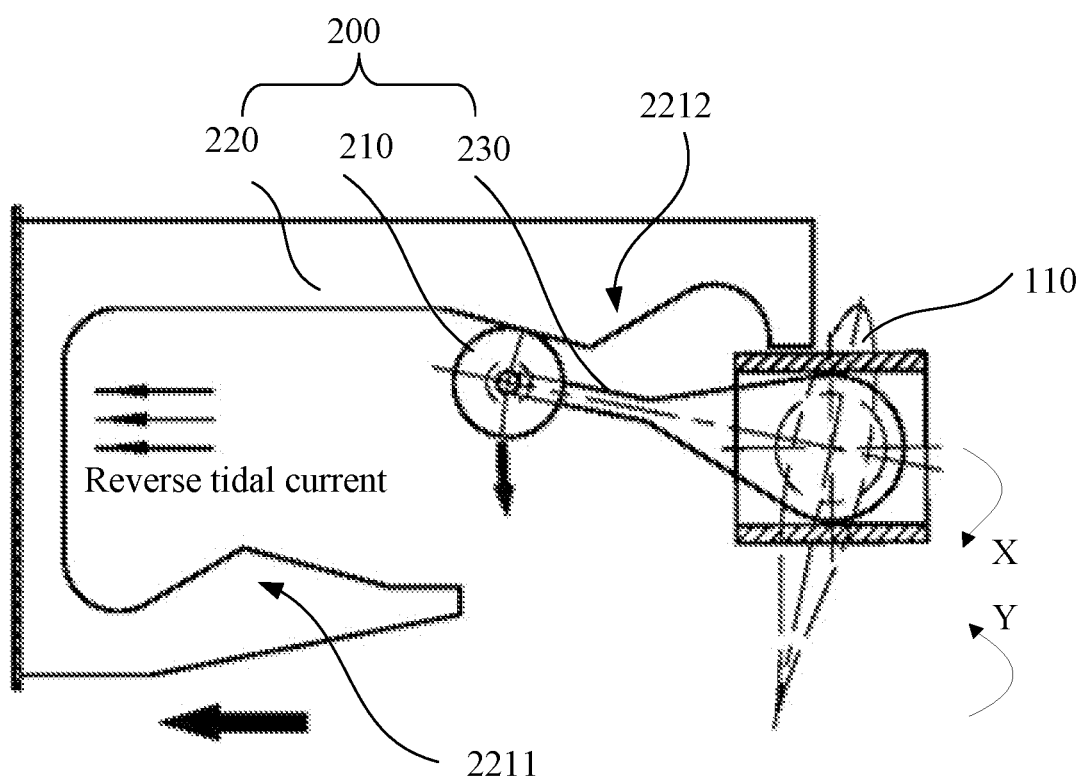
Figure 9:
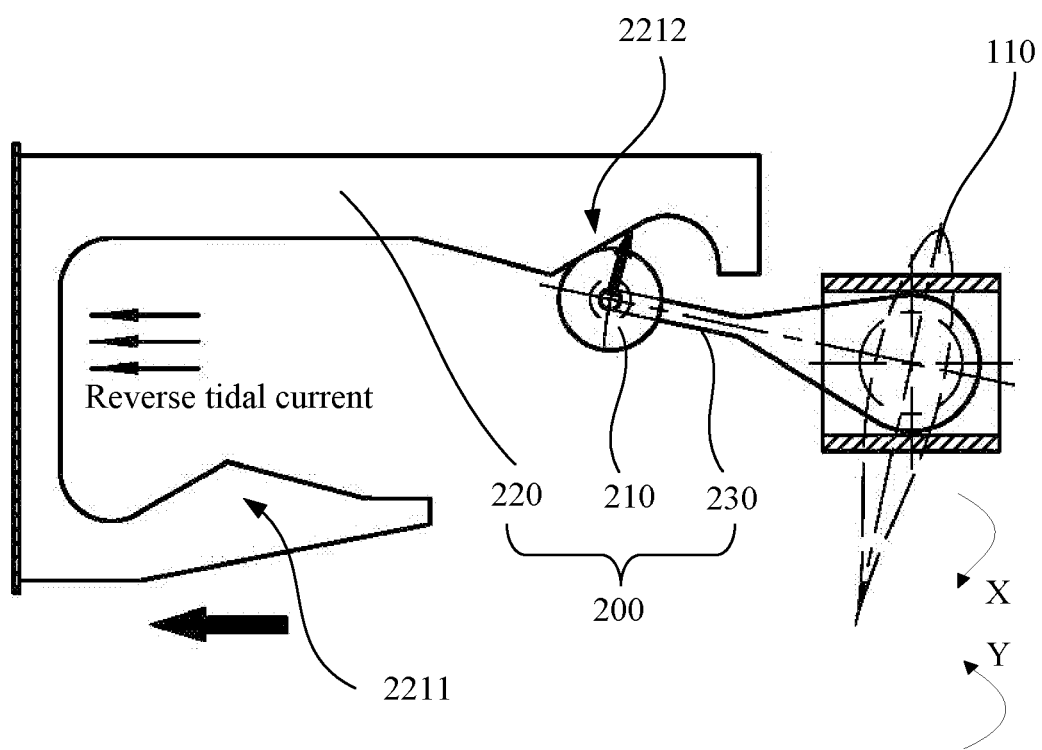
Figure 10:
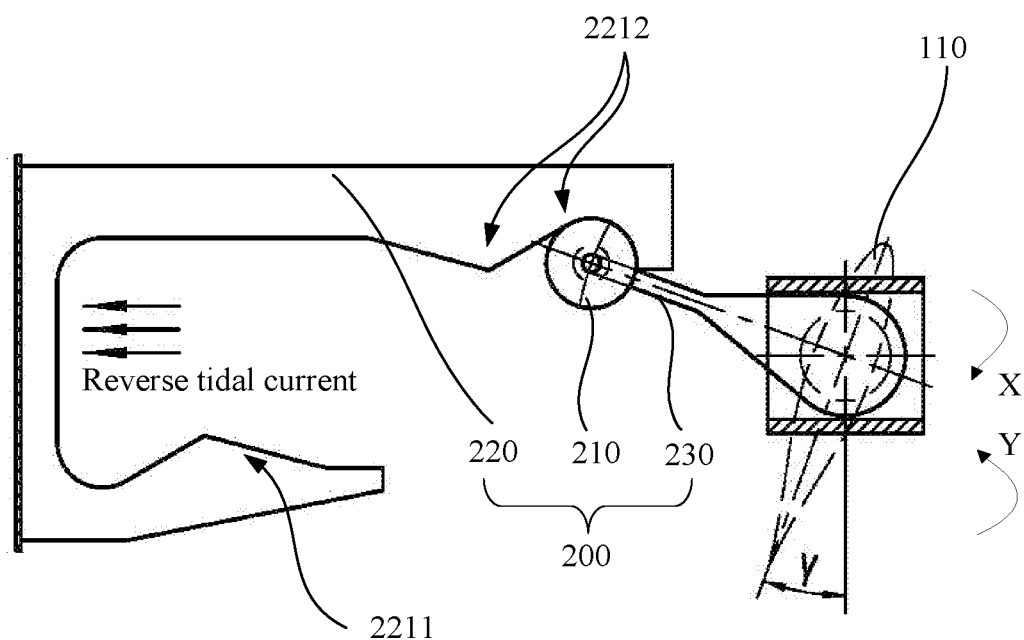

Referring to an embodiment shown in FIGS. 3 and 7, the impeller blade 110 counterclockwise rotates around the axis of the impeller blade 110 under the action of the tidal current (forward tidal current) flowing in the first direction, so as to drive the adjustment wheel 210 to be close to and abut on the first concavo-convex portion 2211, and impeller blade 110 clockwise rotates around the axis of the impeller blade 110 itself under the action of the tidal current (reverse tidal current) flowing in the second direction, so as to drive the adjustment wheel 210 to be close to and abut on the second concavo-convex portion 2212. In this embodiment, such a set makes the impeller blade 110 adapt to both the forward tidal current and the reverse tidal current. In this embodiment, the direction of the axis of the impeller blade 110 around which the impeller blade 110 counterclockwise rotates is the direction of a Y-axis in FIG. 3, and the direction of the axis of the impeller blade 110 around which the impeller blade 110 clockwise rotates is the direction of an X-axis in FIG. 3.

Referring to an embodiment shown in FIGS. 3-6, the first concavo-convex portion 2211 includes a first edge 22111, a second edge 22112, a third edge 22113, and a fourth edge 22114. the first edge 22111, the second edge 22112, the third edge 22113, and the fourth edge 22114 are connected in sequence along the second direction. A shortest distance between each part on the first edge 22111 and the second concavo-convex portion 2212 is the same. A shortest distance between the second edge 22112 and the second concavo-convex portion 2212 gradually decreases from an end of the second edge 22112 connected with the first edge 22111 to an end of the second edge 22112 connected with the third edge 22113. A shortest distance between the third edge 22113 and the second concavo-convex portion 2212 increases from an end of the third edge 22113 connected with the second edge 22112 to the end of the third edge 22113 connected with the fourth edge 22114. Among the first edge 22111, the second edge 22112, the third edge 22113, and the fourth edge 22114, a shortest distance between the fourth edge 22114 and the second concavo-convex portion 2212 is the largest. The adjustment wheel is configured to abut against the first edge 22111. The adjustment plate 220 is configured to be driven under the action of the tidal current flowing along the first direction to move along the first direction relative to the adjustment wheel, so that the adjustment wheel 210 is in contact with the first edge 22111, the second edge 22112, the third edge 22113, and the fourth edge 22114 in sequence, thereby making the adjustment wheel 210 swing to drive the impeller blade 110 to rotate around the axis of the impeller blade 110 relative to the impeller hub 120 to adjust the angle of the impeller blade 110. In this embodiment, the shape of the fourth edge 22114 is adapted to the shape of the adjustment wheel 210, which facilitates the fourth edge 22114 to accommodate and abut against the adjustment wheel 210.

In an embodiment shown in FIGS. 3-6, when the adjustment wheel 210 is in contact with the first edge 22111, the adjustment wheel 210 does not swing, so that the energy received by the impeller blade 110 from the tidal current becomes larger and the impeller blade 110 obtains a greater torque, so as to facilitate the starting of the impeller blade 110, that is, it is convenient for the impeller blade 110 to drive the impeller hub 120 to synchronously rotate around the axis of the connecting shaft 400. During the process that the adjustment wheel 210 is in contact with the second edge 22112, the adjustment wheel 210 drives the impeller blade 110 to rotate clockwise around the axis of the impeller blade 110 relative to the impeller hub 120, so as to adjust the angle of the impeller blade 110 relative to the impeller hub 120, which increases the lift force and decreases the resistance force. Both of the forces are generated by the impeller blade 110 under the action of the tidal current. The energy harvesting efficiency of the impeller blade 110 is increased. The generator 300 is driven for electricity with higher power. During the process that the adjustment wheel 210 is in contact with the third edge 22113, the adjustment wheel 210 drives the impeller blade 110 to rotate counterclockwise around the axis of the impeller blade 110 relative to the impeller hub 120, so as to adjust the angle of the impeller blade 110 relative to the impeller hub 120, which decreases the lift force and increases the resistance force. Both of the forces are generated by the impeller blade 110 under the action of the tidal current. The energy harvesting efficiency of the impeller blade 110 is decreased. And the generator 300 is driven for electricity with lower power, to avoid the damage of the impeller 100 or the generator 300 due to overload. The fourth edge 22114 is configured to abut against the adjustment wheel 210, so that the adjustment plate 220 fails to move along the first direction relative to the adjustment wheel 210, which maintains the relative lower lift force and higher resistance force generated by the impeller blade 110 under the action of the tidal current, to avoid the damage of the impeller 100 or the generator 300 due to overload.

As shown in FIGS. 7-10, the second concavo-convex portion 2212 includes a fifth edge 22121, a sixth edge 22122, a seventh edge 22123, and a eighth edge 22124; the fifth edge 22121, the sixth edge 22122, the seventh edge 22123, and the eighth edge 22124 are connected in sequence along the first direction; a shortest distance between each part on the fifth edge 22121 and the first concavo-convex portion 2211 is the same. A shortest distance between the sixth edge 22122 and the first concavo-convex portion 2211 decreases from an end of the sixth edge 22122 connected with the fifth edge 22121 to an end of the sixth edge 22122 connected with the seventh edge 22123. A shortest distance between the seventh edge 22123 and the first concavo-convex portion 2211 increases from an end of the seventh edge 22123 connected with the sixth edge 22122 to the end of the seventh edge 22123 connected with the eighth edge 22124. Among the fifth edge 22121, the sixth edge 22122, the seventh edge 22123, and the eighth edge 22124, a shortest distance between the eighth edge 22124 and the first concavo-convex portion 2211 is the largest. The adjustment wheel 210 is configured to abut against the fifth edge 22121. The adjustment plate 220 is configured to be driven under the action of the tidal current flowing along the second direction to move along the second direction relative to the adjustment wheel 210, so that the adjustment wheel 210 is in contact with the fifth edge 22121, the sixth edge 22122, the seventh edge 22123, and the eighth edge 22124 in sequence, thereby making the adjustment wheel 210 swing drive the impeller blade 110 to rotate around the axis of the impeller blade 110 relative to the impeller hub 120, so as to adjust the angle of the impeller blade 110. In this embodiment, the shape of the eighth edge is adapted to the shape of the adjustment wheel 210, so that the eighth edge accommodates and abuts against the adjustment wheel 210.

As illustrated in FIGS. 7-10, when the adjustment wheel 210 is in contact with the fifth edge 22121, the adjustment wheel 210 does not swing, so that the tidal current energy received from the tidal current by the impeller blade 110 becomes higher and the impeller blade 110 obtains a greater torque, which facilitates the starting of the impeller blade 110, that is, it is convenient for the impeller blade 110 to drive the impeller hub 120 to rotate synchronously around the axis of the connecting shaft 400. During the process that the adjustment wheel 210 is in contact with the sixth edge 22122, the adjustment wheel 210 drives the impeller blade 110 relative to the impeller hub 120 to rotate counterclockwise around the axis of the impeller blade 110 itself, so as to adjust the angle of the impeller blade 110 relative to the impeller hub 120, which increases the lift force and decreases the resistance force. Both of the forces are generated by the impeller blade 110 under the action of the tidal current. The energy harvesting efficiency of the impeller blade 110 is increased and the generator 300 is driven to generate electricity with higher power. During the process that the adjustment wheel 210 is in contact with the seventh edge 22123, the adjustment wheel 210 drives the impeller blade 110 relative to the impeller hub 120 to rotate clockwise around the axis of the impeller blade 110 itself, so as to adjust the angle of the impeller blade 110 relative to the impeller hub 120, which decreases the lift force and increases the resistance force. Both of the forces are generated by the impeller blade 110 under the action of the tidal current. the energy harvesting efficiency of the impeller blade 110 is decreased and the generator 300 is driven to generate electricity with lower power, to avoid the damage of the impeller 100 or the generator 300 due to overload. The eighth edge is configured to abut against the adjustment wheel 210, such that the adjustment plate 220 fails to move along the second direction relative to the adjustment wheel 210, which maintains the relative lower lift force and higher resistance force generated by the impeller blade 110 under the action of the tidal current, to avoid the damage of the impeller 100 or the generator 300 due to overload.

Referring to an embodiment shown in FIGS. 1 and 3, the adjustment assembly 200 further includes an adjustment rod 230. One end of the adjustment rod 230 is fixedly sleeved on the impeller blade 110, and the other end of the adjustment rod 230 is connected with the adjustment wheel 210. The adjustment plate 220 is configured to be driven under the action of the tidal current to move along the first direction or the second direction relative to the adjustment wheel 210, so that the position where the concavo-convex portion 221 is in contact with the adjustment wheel 210 is changed to drive the impeller blade 110 to rotate around the axis of the impeller blade 110 relative to the impeller hub 120 through the adjustment rod 230, so as to adjust the angle of the impeller blade 110.

Figure 11:
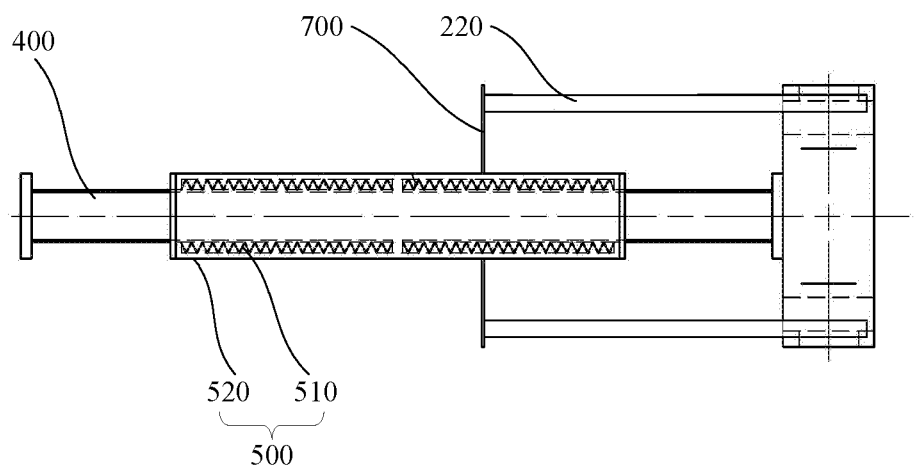
FIGS. 11-13 schematically illustrate the fitting between an adjustment assembly and an elastic assembly.

As depicted in FIG. 11, the tidal current energy generating device includes an elastic assembly 500, which is sleeved on the connecting shaft 400. One end of the elastic assembly 500 is connected with the connecting shaft 400, and the other end of the elastic assembly 500 is connected with the adjustment plate 220. The elastic assembly 500 is configured to elastically hinder a movement of the adjustment plate 220 along the first direction or the second direction under the action of the tidal current.

In this embodiment, when the tidal current drives the adjustment plate 220 to move along the first direction or the second direction relative to the adjustment wheel 210, it is required to overcome the elastic force of the elastic assembly 500, so that the elastic assembly 500 will be stretched or compressed. With the consistent tidal current velocity, the force of the tidal current will be equal to the elastic force of the elastic assembly 500, after the elastic assembly 500 is stretched or compressed to a certain extent. Then, if the tidal current velocity increases, the force of the tidal current drives the adjustment plate 220 to continue moving, until the force of the tidal current is equal to the elastic force of the elastic assembly 500. If the tidal current velocity decreases, the adjustment plate 220 will continue moving along the direction opposite to the previous direction till the action of the tidal current is equal to the elastic force of the elastic assembly 500, under the elastic force of the elastic assembly 500.

In FIGS. 1 and 11, the elastic assembly 500 includes an elastic component 510 and a sleeve 520. The sleeve 520 is sleeved on the connecting shaft 400, and the connecting shaft 400 is connected with the adjustment plate 220. One end of the elastic component 510 is connected with the sleeve 520, and the other end of the elastic component 510 is connected with the connecting shaft 400. The adjustment plate 220 is configured to be driven under the action of the tidal current to move along the first direction and the second direction relative to the adjustment wheel 210, so as to drive the sleeve 520 to move along the first direction or the second direction to allow the elastic component 510 to be stretched or compressed, so that the elastic assembly is capable of elastically hindering the movement of the adjustment plate 220 along the first direction or the second direction under the action of the tidal current. In this embodiment, the elastic component is a spring.

As shown in FIG. 1, the elastic component 510 includes a first elastic component and a second elastic component. One end of the first elastic component is connected with the connecting shaft 400, and the other end of the first elastic component is connected with a first end of the sleeve 520. One end of the second elastic component is connected with the connecting shaft 400, and the other end of the second elastic component is connected with a second end of the sleeve 520.

Figure 12:
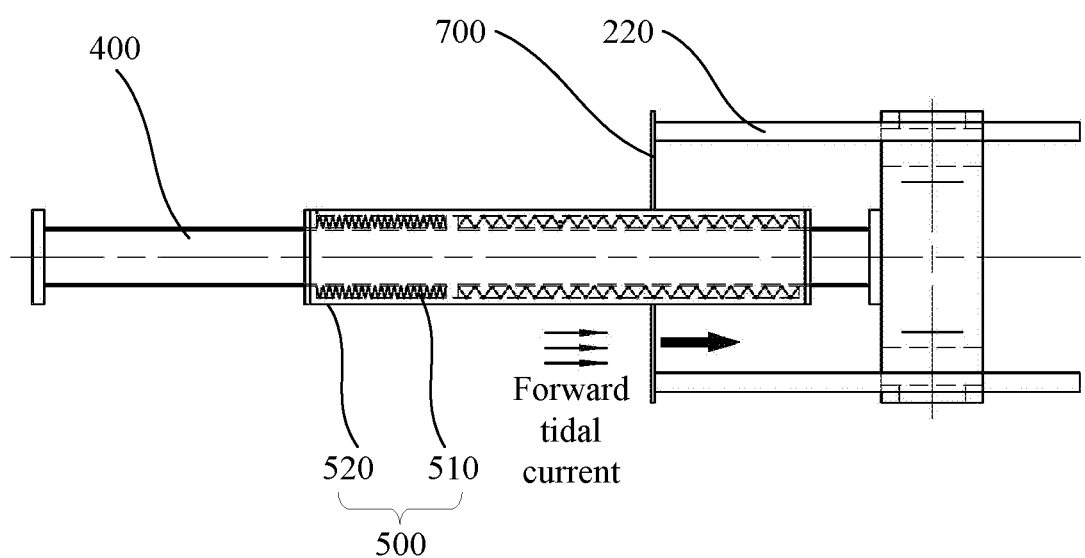
Figure 13:
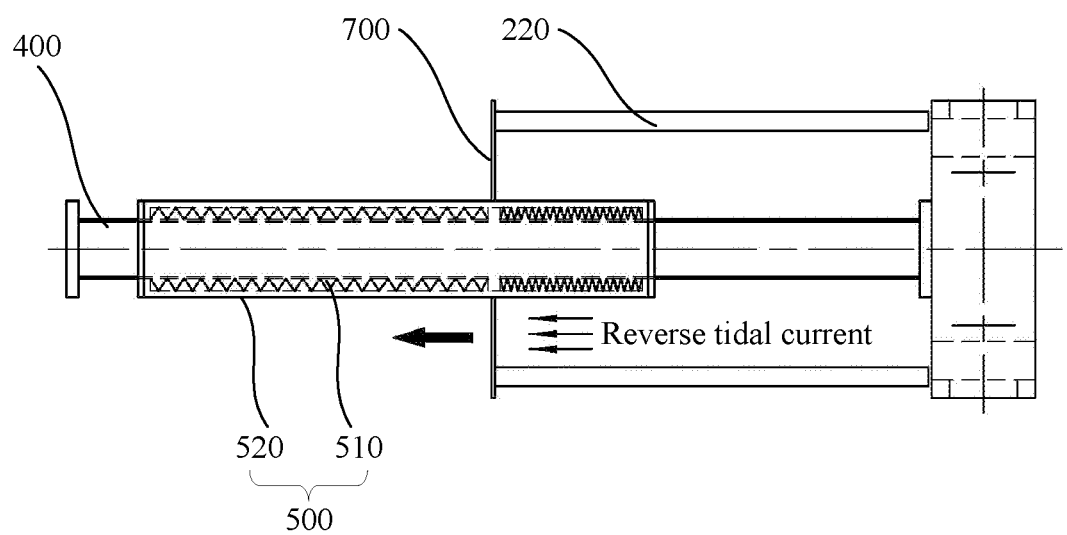

In this embodiment, in FIGS. 11 and 12, when the forward tidal current drives the adjustment plate 220 to move along the first direction relative to the adjustment wheel 210, the sleeve 520 is driven to move synchronously in the first direction to compress the first component (i.e., the left elastic component in FIG. 11) and stretch the second elastic component (i.e., the right elastic component in FIG. 11). In FIGS. 11 and 13, when the reverse tidal current drives the adjustment plate 220 relative to the adjustment wheel 210 to move along the second direction, the sleeve 520 is driven to move along synchronously the second direction, thereby making the first elastic component stretched, and the second elastic component compressed. As used herein, "the left elastic component in FIG. 11" and "the right elastic component in FIG. 11" are merely used to facilitate the understanding with the help of FIGS. 11-13, and should not considered as limitation.

In FIG. 1, the tidal current energy generating device includes a fixed frame 600, and the generator 300 is installed on the fixed frame 600.

In FIG. 1, the tidal current energy generator device includes a thrust plate 700. The thrust plate 700 is connected with the adjustment plate 220, and the thrust plate 700 is configured to move along the first direction or the second direction under the action of the tidal current, thereby driving the adjustment plate 220 to move synchronously along the first direction or the second direction.

Referring to an embodiment shown in FIG. 1, the adjustment plate 220 is connected with the elastic assembly 500 through the thrust plate 700. In this embodiment, the thrust plate 700 is arranged on the elastic assembly 500, and the thrust plate 700 is connected with the adjustment plate 220. The tidal current drives the adjustment plate 220 to move along the first direction or the second direction relative to the adjustment wheel 210, so that the elastic assembly 500 is stretched or compressed. In this embodiment, the thrust plate 700 is sleeved on the sleeve 520, and the adjustment plate 220 is connected with the sleeve 520 through the thrust plate 700.

Described above are merely preferred embodiments of the present application, which are not intended to limit the scope of the present application. It should be understood that any replacements, modifications and changes made by those skilled in the art without departing from the spirit of the application shall fall within the scope of the present application defined by the appended claims.

What is claimed is:

1. A tidal current energy generating device, comprising:
    a generator;
    a connecting shaft;
    an impeller; and
    an adjustment assembly;
    wherein the impeller comprises an impeller blade and an impeller hub, and the impeller blade is arranged on the impeller hub; the impeller hub is connected with the connecting shaft, and the generator is connected with the impeller hub; the impeller blade is configured to drive the impeller hub to rotate synchronously around an axis of the connecting shaft under an action of a tidal current, so as to drive the generator to generate electricity;
    the adjustment assembly is connected with the impeller blade; the adjustment assembly is configured to swing under the action of the tidal current to drive the impeller blade to rotate around an axis of the impeller blade relative to the impeller hub to adjust an angle of the impeller blade, such that an energy received by the impeller blade from the tidal current is adjusted to adjust a rotating speed of the impeller blade around the axis of the connecting shaft, adjusting a power of the generator; and
    wherein the adjustment assembly comprises an adjustment wheel and an adjustment plate; the adjustment plate is provided with a concavo-convex portion; the adjustment wheel is configured to abut on the concavo-convex portion, and the adjustment wheel is connected with the impeller blade; the adjustment plate is configured to move relative to the adjustment wheel along a first direction or a second direction opposite to the first direction under the action of the tidal current, so that a position where the concavo-convex portion is in contact with the adjustment wheel is changed to drive the adjustment wheel to swing to drive the impeller blade to rotate around the axis of the impeller blade relative to the impeller hub, so as to adjust the angle of the impeller blade.

2. The tidal current energy generating device of claim 1, wherein the concavo-convex portion comprises a first concavo-convex portion and a second concavo-convex portion opposite to each other; the tidal current is configured to flow along the first direction or the second direction; the adjustment wheel is configured to abut on the first concavo-convex portion; the adjustment plate is configured to be driven under the action of the tidal current flowing along the first direction to move along the first direction relative to the adjustment wheel, so that a position where the first concavo-convex portion is in contact with the adjustment wheel is changed to allow the adjustment wheel to swing to drive the impeller blade to rotate around the axis of the impeller blade relative to the impeller hub, adjusting the angle of the impeller blade; the adjustment wheel is configured to abut on the second concavo-convex portion; the adjustment plate is configured to be driven under the action of the tidal current flowing along the second direction to move along the second direction relative to the adjustment wheel, so that a position where the second concavo-convex portion is in contact with the adjustment wheel is changed to allow the adjustment wheel to swing to drive the impeller blade to rotate around the axis of the impeller blade relative to the impeller hub, adjusting the angle of the impeller blade.

3. The tidal current energy generating device of claim 2, wherein the first concavo-convex portion comprises a first edge, a second edge, a third edge and a fourth edge; the first edge, the second edge, the third edge and the fourth edge are connected in sequence along the second direction; a shortest distance between each part on the first edge and the second concavo-convex portion is the same; a shortest distance between the second edge and the second concavo-convex portion decreases from an end of the second edge connected with the first edge to an end of the second edge connected with the third edge; a shortest distance between the third edge and the second concavo-convex portion from an end of the third edge connected with the second edge to an end of the third edge connected with the fourth edge increases; among the first edge, the second edge, the third edge and the fourth edge, a shortest distance between the fourth edge and the second concavo-convex portion is the largest; the adjustment wheel is configured to abut against the first edge; the adjustment plate is configured to be driven under the action of the tidal current flowing along the first direction to move along the first direction relative to the adjustment wheel, so that the adjustment wheel is in contact with the first edge, the second edge, the third edge and the fourth edge in sequence, thereby making the adjustment wheel swing to drive the impeller blade to rotate around the axis of the impeller blade relative to the impeller hub to adjust the angle of the impeller blade.

4. The tidal current energy generating device of claim 2, wherein the second concavo-convex portion comprises a first edge, a second edge, a third edge and a fourth edge; the first edge, the second edge, the third edge and the fourth edge are connected in sequence along the first direction; a shortest distance between each part on the first edge and the first concavo-convex portion is the same; a shortest distance between the second edge and the first concavo-convex portion from an end of the second edge connected with the first edge to an end of the second edge connected with the third edge decreases, and a shortest distance between the third edge and the first concavo-convex portion from an end of the third edge connected with the second edge to an end of the third edge connected with the fourth edge increases; among the first edge, the second edge, the third edge and the fourth edge, a shortest distance between the fourth edge and the first concavo-convex portion is the largest; the adjustment wheel is configured to abut against the first edge; the adjustment plate is configured to be driven under the action of the tidal current flowing along the second direction to move along the second direction relative to the adjustment wheel, so that the adjustment wheel is in contact with the first edge, the second edge, the third edge and the fourth edge in sequence, thereby making the adjustment wheel swing to drive the impeller blade to rotate around the axis of the impeller blade relative to the impeller hub, so as to adjust the angle of the impeller blade.

5. The tidal current energy generating device of claim 1, further comprising:

a thrust plate;

wherein the thrust plate is connected with the adjustment plate, and the thrust plate is configured to move along the first direction or the second direction under the action of the tidal current, thereby driving the adjustment plate to move synchronously along the first direction or the second direction.

6. The tidal current energy generating device of claim 1, wherein the adjustment assembly further comprises an adjustment rod; one end of the adjustment rod is fixedly sleeved on the impeller blade, and the other end of the adjustment rod is connected with the adjustment wheel; and the adjustment plate is configured to be driven under the action of the tidal current to move along the first direction or the second direction relative to the adjustment wheel, so that the position where the concavo-convex portion is in contact with the adjustment wheel is changed to drive the impeller blade to rotate around the axis of the impeller blade relative to the impeller hub through the adjustment rod, so as to adjust the angle of the impeller blade.

7. The tidal current energy generating device of claim 1, further comprising:

an elastic assembly;

wherein the elastic assembly is sleeved on the connecting shaft; one end of the elastic assembly is connected with the connecting shaft, and the other end of the elastic assembly is connected with the adjustment plate; and the elastic assembly is configured to elastically hinder a movement of the adjustment plate along the first direction or the second direction under the action of the tidal current.

8. The tidal current energy generating device of claim 7, wherein the elastic assembly comprises an elastic component and a sleeve; the sleeve is sleeved on the connecting shaft, and the connecting shaft is connected with the adjustment plate; one end of the elastic component is connected with the sleeve, and the other end of the elastic component is connected with the connecting shaft; and the adjustment plate is configured to be driven under the action of the tidal current to move along the first direction and the second direction relative to the adjustment wheel, so as to drive the sleeve to move along the first direction or the second direction to allow the elastic component to be stretched or compressed, so that the elastic assembly is capable of elastically hindering the movement of the adjustment plate along the first direction or the second direction under the action of the tidal current.

9. The tidal current energy generating device of claim 8, wherein the elastic component comprises a first elastic component and a second elastic component; one end of the first elastic component is connected with the connecting shaft, and the other end of the first elastic component is connected with a first end of the sleeve; one end of the second elastic component is connected with the connecting shaft, and the other end of the second elastic component is connected with a second end of the sleeve.

* * * * *